(12) United States Patent
Pannell

(10) Patent No.: US 9,131,287 B1
(45) Date of Patent: *Sep. 8, 2015

(54) SYSTEM AND METHOD OF PROCESSING MANAGEMENT FRAMES

(71) Applicant: MARVELL INTERNATIONAL LTD., Hamilton (BM)

(72) Inventor: Donald Pannell, Cupertino, CA (US)

(73) Assignee: MARVELL INTERNATIONAL LTD. (BM)

(*) Notice: Subject to any disclaimer, the term of this patent is extended or adjusted under 35 U.S.C. 154(b) by 0 days.

This patent is subject to a terminal disclaimer.

(21) Appl. No.: 14/526,954

(22) Filed: Oct. 29, 2014

Related U.S. Application Data

(60) Continuation of application No. 13/768,049, filed on Feb. 15, 2013, now Pat. No. 8,879,559, which is a division of application No. 11/759,062, filed on Jun. 6, 2007, now Pat. No. 8,379,644.

(60) Provisional application No. 60/818,061, filed on Jun. 30, 2006.

(51) Int. Cl.
| | |
|---|---|
| *H04L 12/58* | (2006.01) |
| *H04Q 11/00* | (2006.01) |
| *H04B 10/27* | (2013.01) |
| *H04L 12/947* | (2013.01) |

(52) U.S. Cl.
CPC .......... *H04Q 11/0005* (2013.01); *H04B 10/27* (2013.01); *H04L 49/25* (2013.01)

(58) Field of Classification Search
CPC .... H04Q 11/0005; H04B 10/27; H04L 49/25; H04L 49/351; H04L 47/10; H04L 47/2441
USPC .................. 370/229, 230, 235, 389, 392, 400
See application file for complete search history.

(56) References Cited

U.S. PATENT DOCUMENTS

| | | |
|---|---|---|
| 6,151,322 A | 11/2000 | Viswanath et al. |
| 7,706,363 B1 | 4/2010 | Daniel et al. |
| 7,877,483 B1 | 1/2011 | Finn |
| 2003/0206559 A1 | 11/2003 | Trachewsky et al. |
| 2004/0047353 A1 | 3/2004 | Umayabashi et al. |
| 2004/0066781 A1 | 4/2004 | Shankar et al. |
| 2006/0002386 A1 | 1/2006 | Yik et al. |
| 2006/0020777 A1 | 1/2006 | Suzuki et al. |
| 2006/0126651 A1 | 6/2006 | Yu |
| 2006/0153069 A1 | 7/2006 | Lund et al. |
| 2007/0076719 A1 | 4/2007 | Allan et al. |
| 2007/0201357 A1 | 8/2007 | Smethurst et al. |
| 2008/0049621 A1 | 2/2008 | McGuire et al. |
| 2008/0310417 A1 | 12/2008 | Friskney et al. |
| 2009/0207857 A1 | 8/2009 | Alexander, Jr. |

*Primary Examiner* — Paul H Masur

(57) ABSTRACT

A system and method of processing management frames implement a switching strategy is disclosed. In one embodiment, a method of processing frames received in a network switch comprises identifying control frames from the received frames, wherein a control frame includes instruction messages, and identifying non-control frames that include data traffic. For identified control frames, the control frames are modified by inserting a value for an EtherType within the control frame. The value of the EtherType is not inserted within the non-control frames. The method transmits the frames to a central processing unit (CPU) or other frame processing device within the network switch wherein the CPU is configured to identify the control frames from the non-control frames by the value of the EtherType in the frames.

19 Claims, 4 Drawing Sheets

SYSTEM AND METHOD OF PROCESSING MANAGEMENT FRAMES

CROSS-REFERENCE TO RELATED APPLICATIONS

This disclosure is a continuation of U.S. application Ser. No. 13/768,049 filed on Feb. 15, 2013 now U.S. Pat. No. 8,879,559 which is a divisional of U.S. application Ser. No. 11/759,062 filed on Jun. 6, 2007 now U.S. Pat. No. 8,379,644, which claims benefit under 35 USC §119(e) to U.S. provisional application Ser. No. 60/818,061 filed on Jun. 30, 2006, which are both incorporated herein by reference in their entirety.

BACKGROUND

1. Field

Aspects of the present disclosure relate generally to switching techniques in network communication systems, and more particularly to a system and method of processing management frames to support an interface between a generic network device and a distributed switching architecture enabled switch.

2. Background

Recently, the Ethernet passive optical network (EPON) market has been experiencing growth and development. Several networking equipment manufacturers and network managers have sought to create or to enable architectures in which an EPON physical layer device (PHY) is coupled to an Ethernet switch device which may be a distributed switching architecture (DSA) enabled switch. In some network infrastructure arrangements, it may be desirable to employ a gigabit Ethernet (GE) link operating at one gigabit per second (Gbit), such as a gigabit media independent interface (GMII), for instance, between an EPON device and a switch. In use, the switch may provide a GE link allowing the EPON device to access a local area network (LAN) via a serializer/deserializer (SerDes) device, an access control server (such as a 1111 device marketed by Cisco Systems), or some other network component. Additionally or alternatively, the switch may provide the EPON device access to the LAN via one or more fast Ethernet (FE) links operating at 100 megabits per second (Mbit) or faster.

As is known in the art, a typical EPON PHY device may contain a relatively low bandwidth microprocessor or microcontroller (such as an 8051-style central processing unit (CPU) marketed by Intel Corporation, for instance) that generally cannot reliably process data at GE or FE data rates. Nevertheless, it may be desirable in some situations to run Spanning Tree protocols on such a CPU. In accordance with the switching techniques employed at a DSA switch, data frames handled by the switch must be DSA Tagged. However, network frames in general, though using the same paths as the DSA Tagged frames, cannot be DSA Tagged since a generic network hardware device may not know how to convert a DSA Forward (i.e., a data frame, as opposed to a management frame) into a generic network frame. This is true even with respect to routing devices that use sophisticated microprocessor components capable of high speed, high bandwidth data processing. Any Spanning Tree control frame destined to or egressing from the management CPU must generally contain additional information about the physical source or destination port. With respect to a DSA enabled switch, data identifying these ports are placed in the DSA Tag. If the same path to the management CPU is also used for normal, non-control, frames, then it is generally desirable that these normal frames remain in a normal frame format so that the CPU does not have to convert each and every frame. This is true even if the control frames use some other format different from that employed by a DSA enabled switch.

Hence, it would be desirable to provide a method and system facilitating an interface between a generic device and a DSA enabled or other switch to enable construction and detection of control frames, while at the same time leaving normal network frames unmodified.

SUMMARY

In one embodiment, the disclosure describes a system and method of processing management frames that support an interface between a generic device and a distributed switching architecture enabled switch. In accordance with one aspect of the invention, control or management frames may be identified and processed independent of ordinary network traffic.

In one aspect of the disclosure, a method of processing frames received in a network switch comprises identifying control frames from the received frames, wherein a control frame includes instruction messages, and identifying non-control frames that include data traffic. For identified control frames, the control frames are modified by inserting a value for an EtherType within the control frame. The value of the EtherType is not inserted within the non-control frames. The method transmits the frames to a central processing unit (CPU) or other frame processing device within the network switch wherein the CPU is configured to identify the control frames from the non-control frames by the value of the EtherType in the frames.

In another aspect of the disclosure, a switch comprises a central processing unit (CPU) configured to process frames; at least a first port configured to receive frames from a network connection; wherein the first port is configured to (i) identify control frames from the received frames, wherein a control frame includes instruction messages, and (ii) identify non-control frames that include data traffic; a second port connected to the first port via a first data path and configured to transmit frames to the central processing unit; wherein the second port is configured to process frames received from the first port by (i) for identified control frames, modifying the control frames by inserting a value for an EtherType within the control frame; and (ii) not inserting the value of the EtherType within the non-control frames; and wherein the central processing unit is configured to receive the frames from at least the second port and is configured to identify the control frames from the non-control frames by the value of the EtherType in the frames.

The foregoing and other aspects of various embodiments of the present disclosure will be apparent through examination of the following detailed description thereof in conjunction with the accompanying drawing figures.

BRIEF DESCRIPTION OF THE DRAWING FIGURES

DETAILED DESCRIPTION

Introduction

Figure 1:
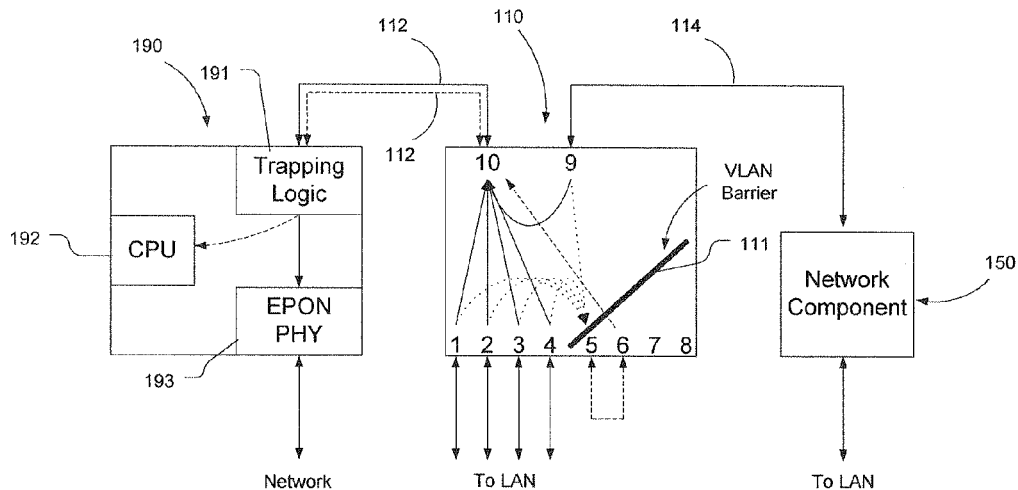
FIG. 1 is a simplified block diagram illustrating one embodiment of a switching strategy supporting an interface between an Ethernet passive optical network device and a distributed switching architecture enabled switch.
Figure 2:
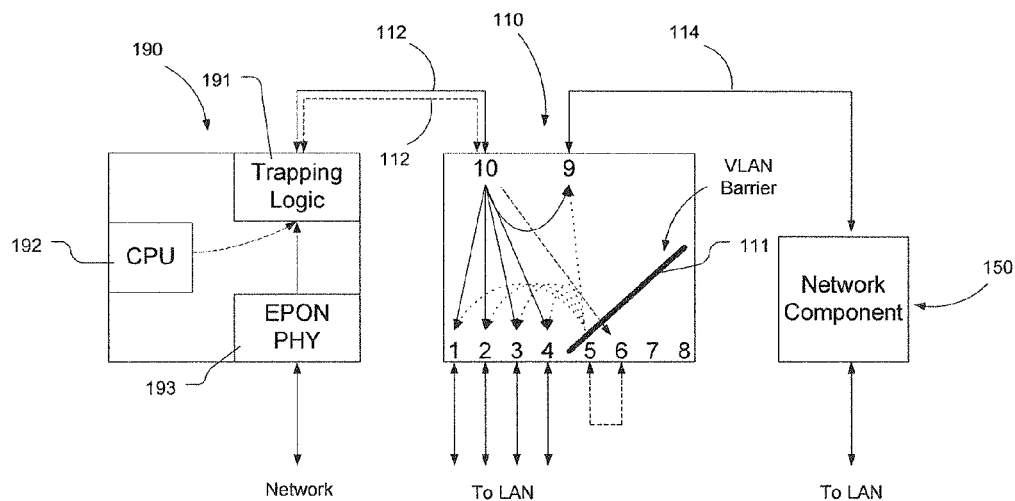
FIG. 2 is a simplified block diagram illustrating another embodiment of a switching strategy supporting an interface between an Ethernet passive optical network device and a distributed switching architecture enabled switch.

Turning now to the drawing figures, FIGS. 1 and 2 are simplified block diagrams illustrating embodiments of a switching strategy supporting an interface between an Ethernet passive optical network (EPON) device and a distributed switching architecture (DSA) enabled switch. Additional information regarding DSA technology may be found in the following U.S. patent applications, the disclosures of which are incorporated herein by reference: Ser. No. 10/829,866, filed Apr. 21, 2004, entitled "Method and Apparatus for Managing Packets In a Packet Switched Network;" and Ser. No. 11/254,588, filed Oct. 20, 2005, entitled "Inter-Device Flow Control." DSA network traffic generally comprises DSA Tagged Forward frames (containing data traffic) and DSA Tagged control or management (MGMT) frames that carry instruction messages between devices.

As noted briefly above and as illustrated in FIGS. 1 and 2, an EPON device 190 may be coupled to a local area network (LAN) via a DSA enabled switch 110. Switch 110 may enable bi-directional data communication with devices on the LAN via one or more ports, as is generally known in the art. In the illustrated embodiments, ports 1-4 are coupled to the LAN, though other arrangements are possible. In some implementations, ports 1-4 may operate at fast Ethernet (FE) rates, for example, 100 megabits per second (Mbit). Additionally or alternatively, switch 110 may enable bi-directional communication with devices on the LAN through an access control server (such as a Cisco 1111 device), a serializer/deserializer (SerDes), or other equivalent network component, generally identified by reference numeral 150.

In some implementations, it may be desirable to couple switch 110 and network component 150 via a gigabit Ethernet (GE) link, for example, operating at one gigabit per second (Gbit) or greater. Accordingly, a link 114 between switch 110 and network component 150 may be a Gbit link, though other data rates may be necessary or desirable for various applications. It will be appreciated that port 9 of switch 110 may be configured to operate at a data rate sufficient to accommodate full duplex, bi-directional data communications across link 114. Similarly, a link 112 between switch 110 and EPON device 190 may be operative at Gbit rates; in such an exemplary embodiment, port 10 of switch 110 may be configured to operate at rates sufficient to accommodate Gbit data traffic across link 112.

Switching strategies to accommodate the illustrative architectural arrangement depicted in the drawing figures are set forth in detail below. Those of skill in the art will appreciate that specific aspects of the network infrastructure are susceptible of various modifications that may be application specific. Physical characteristics or configurations of ports 1-6, 9, and 10, as well as the data rates supported by links 112 and 114, for instance, may be dictated or influenced by the features or operational attributes of EPON device 190, network component 150, and other factors.

Exemplary Implementations

In the exemplary embodiment, six FE ports (i.e., ports 1-6 of switch 110) may be employed to facilitate interoperability of generic EPON device 190 and DSA enabled switch 110. Two ports (5 & 6) may be used selectively to add DSA Tags to MGMT frames only, while leaving ordinary network frames untouched. Ordinary network data traffic (including both DSA Tagged frames and non-DSA frames) ingressing at ports 1-4 and 9 may be mapped directly to port 10, i.e., they are unmodified, as indicated by the solid arrows in FIG. 1. However, bridge protocol data unit (BPDU) or other MGMT frames ingressing at ports 1-4 and 9 may be mapped to a specific, predetermined port (e.g., port 5 in FIGS. 1 and 2) as indicated by the dotted arrows in FIG. 1. In this context, it will be appreciated that BPDU or other MGMT frames may be identified, for example, based upon a destination address (DA) data field in a frame tag, though other methods of identifying MGMT frames are generally known in the art.

In accordance with some embodiments, MGMT frames may be mapped using a global MGMT trap mechanism. For instance, a dedicated register (e.g., a central processing unit (CPU) Port register) may be employed to determine or otherwise to influence the port to which MGMT frames are mapped. In the illustrated embodiment, ports 1-4 and 9 have their CPU Port register pointing to port 5, ensuring that BPDU or other MGMT frames are mapped to port 5; other mechanisms such as address databases, lookup tables, or other data structures may be employed in conjunction with appropriate logic or processing components at switch 110 to effectuate a similar result.

As illustrated in the drawing figures, both port 5 and port 6 of switch 110 may be isolated behind a virtual LAN (VLAN) barrier (reference numeral 111). VLAN barrier 111 may be implemented to ensure that flooding network frames do not egress either of ports 5 or 6.

In the exemplary embodiment, port 5 is configured as a DSA Tag port; accordingly, MGMT frames egressing this port may be assigned a DSA Tag. Flow of DSA Tagged frames is illustrated by the dashed arrows in the drawing figures. Frames modified with DSA Tags may re-ingress switch 110 at a predetermined or designated port (e.g., at port 6). This designated port may be appropriately configured as a network port with its CPU Port register (or other desired register facilitating internal mapping) pointing to a particular port in data communication with generic EPON device 190. As illustrated in FIG. 1, such a register at port 6 may direct data traffic to port 10.

Given the foregoing mapping strategy, when MGMT frames ingress port 6, they may be mapped to port 10 unmodified (by processing operations at port 6), though they may nevertheless be tagged with the DSA Tag that had been previously added when the frames egressed port 5.

Link 112 between switch 110 and EPON device 190 may carry both DSA Tagged MGMT frames and non-DSA Tagged network frames. As noted above, link 112 may comprise or be embodied in a Gbit media independent interface (GMII), though other bi-directional data links may be suitable as required by a particular application.

As indicated in the drawing figures, EPON device 190 may generally be characterized by trapping logic 191, a CPU 192, and an EPON physical layer device (PHY) 193, which represents the physical structure that interfaces EPON device 190 with a network. In operation, trapping logic 191 may separate MGMT frames (e.g., by reading a DA in the frame tag) from ordinary network traffic; accordingly, only MGMT frames may be forwarded to the internal CPU 192. As noted above, CPU 192 may be implemented as an 8051-type processor, though other suitable microprocessor or microcontroller components may be employed as well, either in addition to, or as an alternative to, an 8051 processor.

While FIG. 1 generally illustrates flow of data frames and MGMT frames from the LAN to EPON device 190 via switch 110, the reverse direction may also be accommodated; this may facilitate transmission of From_CPU DSA Tagged frames from CPU 192 into switch 110 using the same physical port (e.g., port 10 in the illustrated embodiment) as normal network frames received from the EPON interface. In that regard, FIG. 2 depicts an exemplary MGMT frame data path in a direction reversed from that illustrated in FIG. 1.

In particular, CPU 192 may send MGMT frames with a From_CPU DSA Tag into port 10 via link 112. In this situation, a CPU Port register at port 10 may be pointing to port 6; as a consequence, all DA-based MGMT frames will be mapped to port 6. In the exemplary embodiment, neither port 10 nor port 6 is a DSA Tag port; From_CPU management frames mapped to port 6 will egress unmodified. However, port 6 is connected (externally) to port 5, as indicated in the drawing figures. Since port 5 is a DSA enabled port, the From_CPU frame may be processed correctly from there, such that the frame may be mapped out the appropriate physical port (i.e., one or more of ports 1-4 and 9 in FIG. 2) as indicated or directed by data fields in the frame tag. Mapping of MGMT frames from port 5 to ports 1-4 and 9 is indicated by the dotted arrows in FIG. 2.

It is noted that internet group management protocol (IGMP) frames from CPU 192 may require special handling as compared to data protocol data unit (DPDU) frames, such as BPDU frames, for example. DSA Tagged IGMP frames may require that the DA of the frame is recorded in an address database in order that the frame may properly be mapped to port 6 (or to some other predetermined port substantially as set forth above). Some switches may employ an address translation unit (ATU) component maintaining such a database, though other mechanisms for maintaining address information are generally known in the art. Additionally or alternatively, IGMP frames may employ an 0x8100 EtherType; such frames may be IGMP snooped from port 10 to port 6. In accordance with one embodiment, port 5 may be configured to interpret an 0x8100 EtherType as a To_Sniffer DSA Tag that is to be forwarded to an Egress Monitor Destination (EMD). If the EMD is pointing to the desired port, the frame may egress that port with the DSA Tag (0x8100) stripped. It will be appreciated that the foregoing strategy works for untagged IGMP frames.

In accordance with one embodiment, global MGMT frame logic may employ a per-port register setting to indicate where MGMT frames that may be trapped at each port should be mapped; further, those of skill in the art will appreciate that it is not necessary to perform "learning" operations with respect to MGMT frames in accordance with the foregoing techniques.

Snooping MGMT frame trapping may implement the methodology set forth above, since such trapping techniques typically employ a per-port CPU Port register to determine where to map snooped frames. On the other hand, in some circumstances it may be desirable to disable address resolution protocol (ARP) MGMT frame trapping at switch 110; rather, ARP MGMT frame trapping may be executed more reliably in trapping logic 191 associated with EPON device 190. Snooping may also be executed in this trapping logic 191, as all snooped frames will be mapped out port 10 if snooping is disabled. Those of skill in the art will appreciate that these ARP and snooping features may facilitate MGMT frame trapping to a CPU (such as CPU 192) that is VLAN isolated.

A BPDU generally may use To_CPU and From_CPU frames properly to run Spanning Tree protocols; this is true because the physical source port of the frame, among other data fields, must be known. ARP and snoop trapping are generally not required in this instance, since the management CPU port (i.e., port 10) must be a member of every VLAN anyway.

Many network routing devices ("routers") currently use high-end CPU components (as opposed to the typically low bandwidth CPU 192 associated with EPON device 190 described above); some routers may incorporate a transmission control protocol/Internet protocol (TCP/IP) offload engine (TOE) to accelerate routing performance. It is often desirable to enable such high-end routers to support Spanning Tree and other features possibly requiring DSA Tag frame information that is supported by DSA enabled switches. Conventionally, configuring the switch port that connects to the router CPU in DSA Tag mode has caused the TOE features to be disabled, since the TOE is generally not configured to process DSA Tag frames. The foregoing switching strategy described with reference to FIGS. 1 and 2 may be utilized to enable interoperability of such routers and a DSA enabled switch, provided that two ports (i.e., ports 5 and 6) are available at switch 110 for that purpose.

Newer designs of switch 110 may be configured to interface with EPON device 190 or with a router where ports 5 and 6 are not connected externally (with respect to switch 110); specifically, the mapping of ports 5 and 6 described above may be by internal logic or firmware, for instance, without requiring dedicated ports to translate DSA Tagged MGMT frames. While employing two ports as set forth above may provide pin-for-pin backward compatibility, it may be desirable to integrate the foregoing technology within switch 110 itself, freeing two ports (such as ports 5 and 6 in the illustrated embodiments) for other purposes.

In accordance with one embodiment, a modified EtherTyped DSA Tag format may support the foregoing interoperability. In that regard, FIG. 3 is a simplified diagram illustrating one embodiment of a frame tag facilitating an interface between a generic device and a distributed switching architecture enabled switch.

A frame is generally indicated at reference numeral 310. Ethernet frame 310 includes various data fields, including, but not limited to: a preamble; a start-of-frame delimiter (SFD); a destination address (DA); a source address (SA); a length and EtherType indicator (Length/Type); a MAC client data indicator; an optional data pad (PAD), e.g., for use in the event that frame 310 does not meet the minimum frame size as defined in Ethernet; and a frame sequence check (FSC). Additionally, the exemplary frame 310 includes an EtherTyped DSA Tag 390 that is illustrated as exploded on the right side of FIG. 3.

Figure 3:
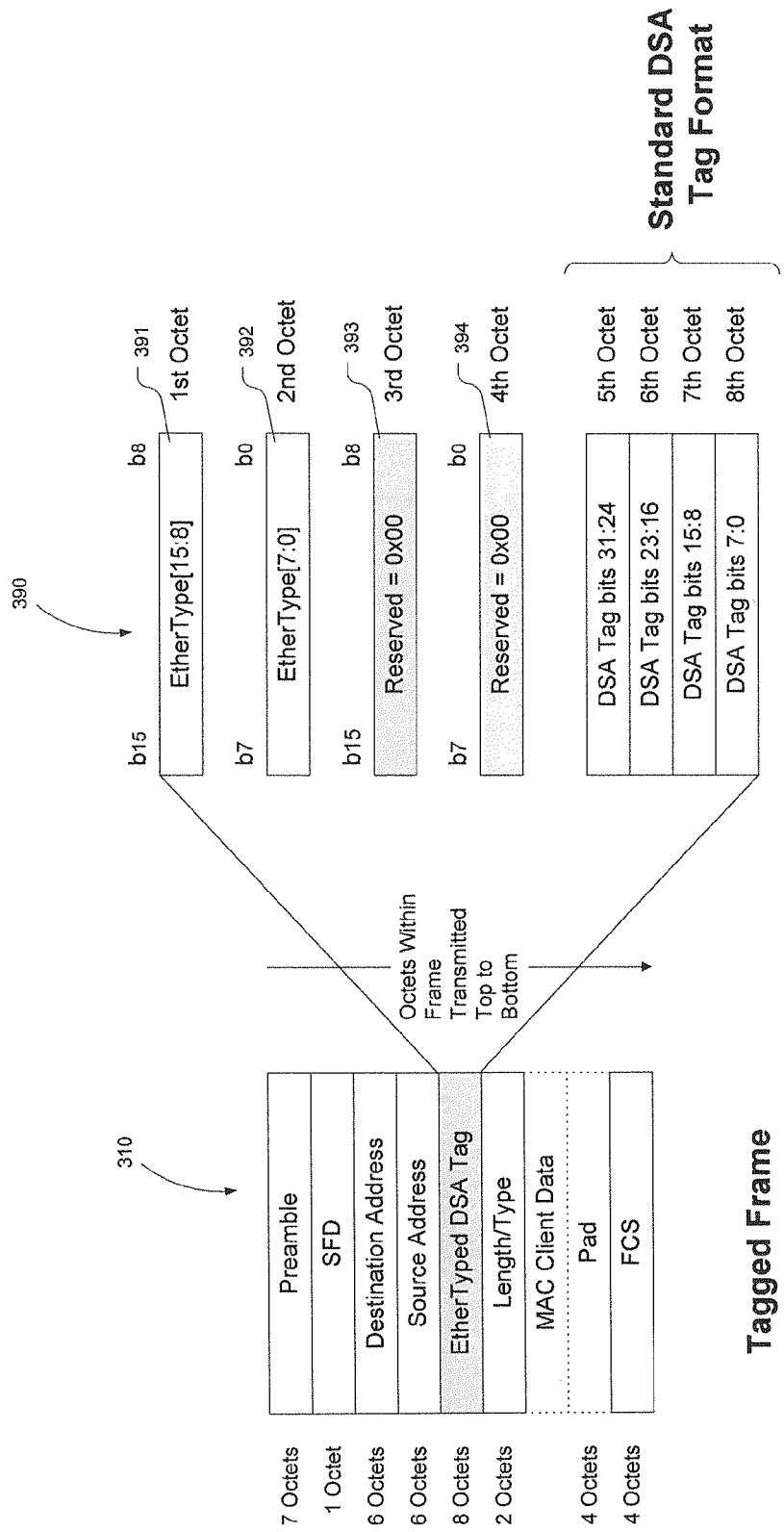
FIG. 3 is a simplified diagram illustrating one embodiment of a frame tag facilitating an interface between a generic device and a distributed switching architecture enabled switch.

In accordance with the FIG. 3 embodiment, the standard DSA Tag format has been modified to include four additional bytes of data. Bytes 391 and 392 define respective EtherTypes that a port may expect to be used for data traffic on a particular network. In that regard, it is generally known that each port at a switch includes a programmable register that identifies the EtherType of frames ingressing the port. By employing bytes 391 and 392, frame 310 may allow such programmable registers at ports selectively to identify types of frames that are not specified by the conventional Length/Type data field (illustrated on the left side of FIG. 3). Bytes 393 and 394 may be reserved for identification of subtypes of frames. Accordingly, additional bytes 391-394 support varied and customizable network protocols, allowing DSA enabled switching hardware to interoperate with various generic or proprietary devices handling a variety of network traffic.

If, upon receipt of a frame, the ingress port can identify the EtherType (i.e., as determined by the value in the EtherType data field (bytes 391 or 392)) as one that is expected or known, then the EtherType and its associated data (e.g., PAD and bytes 393 and 394, if detected) may be removed from frame 310 and tag 390. Accordingly, the switch may handle the frame as a standard DSA Tagged frame (i.e., using the standard format indicated at the bottom right of FIG. 3) or a normal (non-DSA) network frame as appropriate. On egress, the EtherType and PAD data fields may be reinserted for all DSA control frames (i.e., To_CPU, From_CPU, and To_Sniffer), but may or may not be reinserted for Forward frames. Where the EtherType and PAD data fields are not inserted for Forward frames, any Forward DSA Tagged frames received from a DSA port may be converted to normal network frames. The mode for Forward frames egressing a particular port is generally controlled by the Egress Mode bits set at a register associated with the port as indicated in Table I below.

Since all DSA control frames have the EtherType data field reinserted, these frames are readily identifiable as MGMT frames by suitably configured trapping logic 191 in EPON device 190 or a TOE associated with a router.

In the foregoing manner, DSA Tagged To_CPU, From_CPU, and To_Sniffer frames may be trapped, while other data traffic remains unaffected. As noted above, a frame's unique EtherType may be selectively configured for a specific application, allowing DSA enabled switching hardware to be employed in conjunction with generic or propriety network devices and protocols. Any non-DSA EPON device 190 or router may identify MGMT frames in accordance with a programmable EtherType and subtype and subsequently process those frames in accordance with programmable instructions while ignoring the 8 bytes of the standard DSA Tag that the device does not know how to process; additionally or alternatively, such a device may, based on the EtherType, subtype, or both, trap the frame to a CPU for processing in software. Ordinary data traffic frames may ingress and egress normally at full wire speed.

An exemplary port control register supporting the foregoing functionality is set forth below in Table I.

TABLE I

Exemplary Port Control Register

| # Bits | Field | Type | Description |
|---|---|---|---|
| 2 | SA Filtering | RWR | SA Filtering - not part of this feature |
| 2 | Egress Mode | RWR | Egress Mode. These bits determine how frames look when they egress this port.<br>The effect of these bits is controlled by the Frame Mode bits below as follows:<br>When Frame Mode = (00) Normal Network Frames, these bits define the default tagging mode of the egressing frames. The default mode is used when the VLAN identification (VID) assigned to the frame during ingress is not contained in the VLAN translation unit (VTU). The default modes are:<br>00 = Default to Unmodified mode - frames are transmitted unmodified <br>01 = Default to Transmit all frames Untagged - remove the tag from any tagged frame<br>10 = Default to Transmit all frames Tagged - add a tag to any untagged frame (the IEEE standard Ether Type of 0x8100 is used)<br>11 = Reserved for future use<br>When Frame Mode = (01) DSA Tag Frames these bits must remain at 00 as all other modes are 'Reserved for future use'<br>When Frame Mode = (10) Provider Tag Frames these bits must remain at 00 as all other modes are 'Reserved for future use'<br>When Frame Mode = (11) EtherType DSA Tag Frames, these bits define which frames get EtherType DSA Tagged. In this case all Control frames egress with an EtherType DSA Tag regardless of the setting of these bits (Control frames are To_CPU, From_CPU and To_Sniffer). Non-Control frames (i.e., Forward DSA Tag frames) will egress EtherType DSA Tagged if these bits are 0b11, otherwise Forward frames will egress as Normal Network Frames as follows:<br>00 = Egress Forward DSA frames as Unmodified Normal Network Frames<br>01 = Egress Forward DSA frames as Untagged Normal Network Frames<br>10 = Egress Forward DSA frames as Tagged Normal Network Frames<br>11 = Egress all frames from this port with an Ether Type DSA tag<br> If this port has 802.1Q disabled and Cross Chip Port Based VLANs are being used in the switch, this port's EgressMode must be Default to Normal mode (to insure the frames egress the switch looking exactly how they entered the switch) or Always add a Tag (to insure the frames egress the switch with an extra tag compared to how they entered the switch). |
| 1 | Header | RWR | Ingress & Egress Header Mode. - not part of this feature |
| 1 | IGMP/MLD Snoop | RWR | IGMP and MLD Snooping. - not part of this feature |
| 2 | Frame Mode | RWR | Frame Mode. These bits are used to define the expected Ingress and the generated Egress tagging frame format for this port as follows:<br>00 = Normal Network<br>01 = DSA (Distributed Switching Architecture)<br>10 = Provider<br>11 = EtherType DSA<br>00 → Normal Network mode uses industry standard IEEE 802.3ac Tagged or Untagged frames. Tagged frames use an EtherType of 0x8100. Ports that are expected to be connected to standard Ethernet devices should use this mode.<br>01 → DSA mode uses a specifically defined tagged frame format for Chip-to-Chip and Chip-to-CPU connections. The extra data placed in the frame |

TABLE I-continued

Exemplary Port Control Register

| # Bits | Field | Type | Description |
|---|---|---|---|
| | | | facilitates the Spanning Tree Protocol (STP) as well as cross-chip features like Trunks, Mirrors, etc. Ports that are interconnected together to form a larger switch and ports connected to the management CPU must use this mode.<br>10 → Provider mode uses user definable EtherTypes per port to define that a frame is Provider Tagged. Ports that are connected to standard Provider network devices, or devices that use Tagged frames with an EtherType other than 0x8100 should use this mode.<br>Frames that ingress this port with an EtherType that matches the port's PortEType will be considered tagged (for discarding policy), will have the tag's VID and PRI bits assigned to the frame (i.e., they will be used for switching and mapping), and will have the Provider Tag removed from the frame. If subsequent Provider Tags are found following the $1^{st}$ Provider Tag, they too will be removed from the frame with their VID and PRI bits being ignored. Modified frames will be padded if required.<br>Frames that ingress this port with an EtherType that does not match the port's PortEType will be considered untagged (for discarding policy). The ingressing frames are modified so they are ready to egress out Customer ports (Normal Network Frame Mode ports) unmodified.<br>Frames that egress this port will always have a tag added (even if they were already tagged). The added tag will contain this port's PortEType as its EtherType. The PRI bits will be the Frame Priority (FPri) assigned to the frame during ingress. The VID bits will be the source port's Default VID bits (if the source port was in Normal Network mode), or the VID assigned to the frame during ingress (if the source port was in Provider mode or if the frame was DSA Tagged).<br>11 → EtherType DSA mode uses standard DSA Tagged frame information following a user definable EtherType. This mode allows the mixture of Normal Network frames with DSA Tagged frames and is useful to be used on ports that connect to a CPU.<br>Frames that ingress this port with an EtherType that matches the port's PortEType will be considered DSA Tagged and processed accordingly. The frame's EtherType and DSA pad bytes will be removed so the resulting frame will be ready to egress out DSA Tag Mode ports unmodified. Frames that ingress this port with a different EtherType will be considered Normal Network Frames and processed accordingly.<br>DSA Tag control frames (To_CPU, From_CPU and To_Sniffer) that egress this port will always get the port's PortEType inserted followed by two pad bytes of 0x00 before the DSA Tag. DSA Tag Forward frames that egress this port can egress just like the control frames (with the added EtherType and pad) or they can egress as if the port were configured in Normal Network mode. This selection is controlled by the port's EgressMode bits above. |
| 8 | Various bits | Various Values | These bits are not part of this feature |

Figure 4:
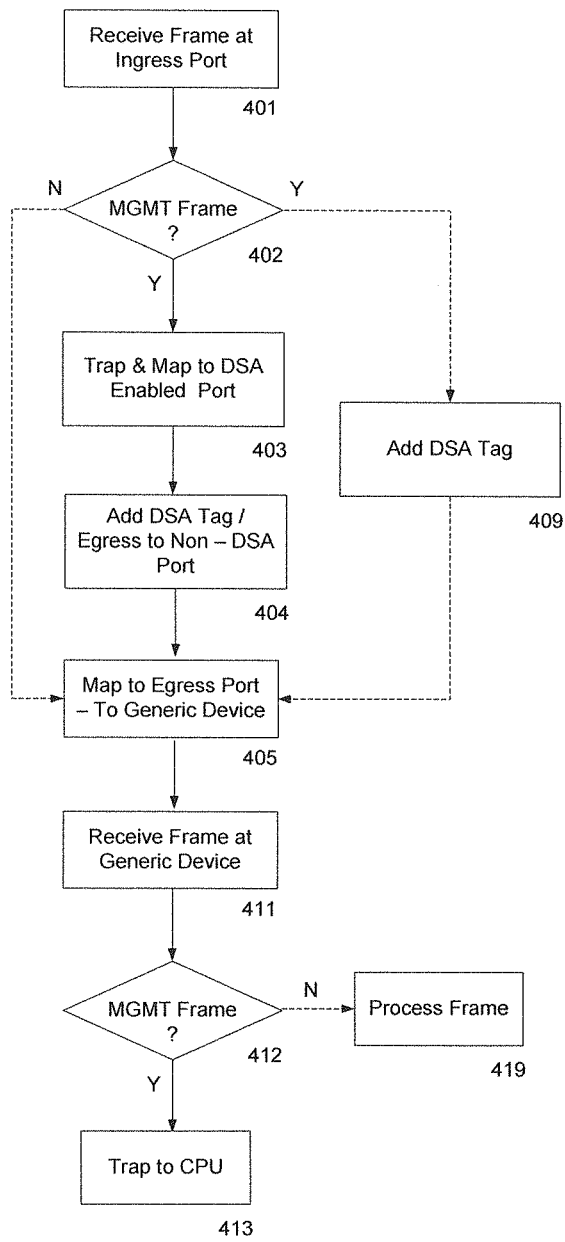
FIG. 4 is a simplified flow diagram illustrating one embodiment of a method of processing management frames to support an interface between a generic device and a distributed switching architecture enabled switch.
Figure 5:
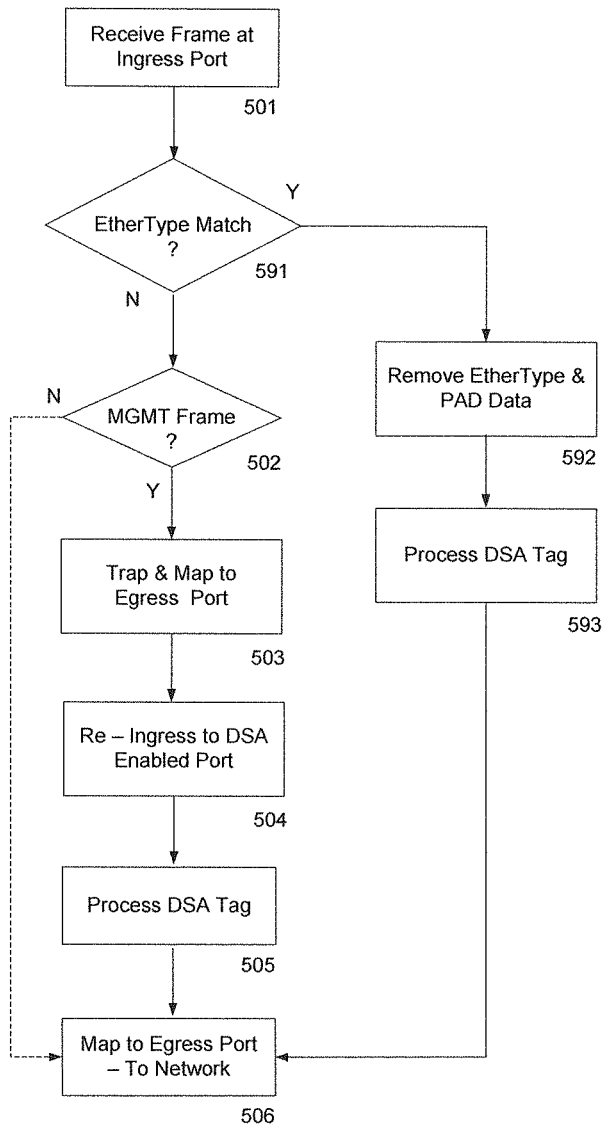
FIG. 5 is a simplified flow diagram illustrating another embodiment of a method of processing management frames to support an interface between a generic device and a distributed switching architecture enabled switch.

FIGS. 4 and 5 are simplified flow diagrams illustrating exemplary operations of embodiments of a method of processing management frames to support an interface between a generic device and a distributed switching architecture enabled switch.

With reference to both FIGS. 4 and 1, as indicated at block 401, the method may generally begin with receiving a data frame at an ingress port (e.g., port 3) of a switch. If a determination is made (e.g., at decision block 402) that the frame is not a MGMT frame, processing may proceed to block 405, i.e., ordinary network data traffic frames may be mapped directly to an egress port (e.g., port 10) in accordance with, for example: DA; SA; MAC client data indicator; other values of data fields in the frame tag; or a combination of the foregoing. As noted above, a frame may be identified as a MGMT frame in some embodiments by the value associated with a DA field in the frame tag. The present disclosure is not intended to be limited to any particular mechanism employed to identify a MGMT frame as such.

If a determination is made that a frame is a MGMT frame, the frame may be trapped and mapped to a predetermined or specified DSA enabled port (e.g., port 5) as indicated at block 403. As noted above, global MGMT frame logic may employ a per-port register setting to indicate a specific port to which MGMT frames should be mapped, though other mechanisms including software solutions may be appropriate in some circumstances. A DSA tag may be assigned to the MGMT frame upon egress from the DSA enabled port as indicated at block 404. In some embodiments, the frame may re-ingress the switch at a non-DSA port (e.g., port 6) which includes a CPU Port register pointing to a particular port (e.g., port 10) in data communication with a generic network device; in the foregoing manner, a DSA Tagged MGMT frame may be mapped to an egress port for transmission to a generic device (block 405).

As noted above, the foregoing switching strategy may be advantageous to the extent that it provides pin-for-pin backward compatibility, but it is not an exclusive solution. As indicated by the dashed arrows on the right of FIG. 4, once a MGMT frame is identified (at decision block 402), a DSA tag may be assigned (block 409) by the switch, and the frame may be mapped to an egress port (block 405) without the additional egress/ingress operations represented by blocks 403 and 404. For example, use of the extended DSA Tag illustrated in FIG. 3 may reduce or eliminate the need to employ dedicated ports as set forth above. Additionally or alternatively, port registers and internal logic, either operating independently or in conjunction with software instruction sets, may readily be implemented to add DSA Tags exclusively to MGMT frames and to map those frames as desired; such a solution may not require additional ports (eliminating the operations at blocks 403 and 404), properly handle MGMT frames, and allow ordinary network traffic to remain unaffected at full wire speed.

A generic network device may receive frames from a switch as indicated at block 411. Again, a determination may be made (e.g., such as at trapping logic 191 or by a TOE at a router) whether a frame is a MGMT frame. If a frame is not identified as a MGMT frame at decision block 412, the frame may be processed as ordinary network traffic (block 419). If a determination is made that a frame is a MGMT frame, the frame may be trapped to a CPU (reference numeral 192 in FIG. 1) for additional necessary or desired processing as indicated at block 413.

With reference to both FIGS. 5 and 2, as indicated at block 501, the method may generally begin with receiving a data frame at an ingress port (e.g., port 10) of a switch. Initially, a determination may be made regarding the EtherType of the frame (decision block 591) If the value in the EtherType data field (e.g., bytes 391 or 392) is a match with one that is expected or known, then the frame is considered EtherType DSA tagged, and may accordingly be processed as illustrated at the right of FIG. 5. As described above with reference to FIG. 3, the EtherType and PAD may be removed (as indicated at block 592) such that the frame may be processed as a normal DSA Tag frame (as indicated at block 593). If the value in the EtherType data field cannot be matched as indicative of a known EtherType, processing may continue as indicated at the left of FIG. 5. The method may then determine whether a non-EtherType DSA tagged frame is a MGMT frame as indicated at decision block 502.

If a determination is made (decision block 502) that the frame is not a MGMT frame, processing may proceed to block 506, i.e., ordinary network data traffic frames may be mapped directly to an egress port (e.g., one of ports 1-4 and 9) in accordance with one or more values of data fields in the frame, either individually or in combination. Various mechanisms including identifying a value associated with the DA data field may be employed to identify a frame as a MGMT frame.

If a determination is made that a frame is a MGMT frame, the frame may be trapped and mapped to a predetermined or specified port (e.g., port 6) as indicated at block 503. In some implementations, global MGMT frame logic may employ a per-port register setting to indicate a specific predetermined port to which MGMT frames should be mapped; in the illustrated embodiments, that predetermined port includes a CPU Port register pointing to a DSA enabled port (e.g., port 5). Accordingly, a MGMT frame egresses (block 503) the switch, then re-ingresses a DSA port as indicated at block 504. A DSA tag may be processed (e.g., in accordance with register settings) at the DSA port (block 505) to enable proper mapping to an egress port for transmission across a network (block 506).

As set forth above with specific reference to FIG. 3, DSA control frames include an EtherType data field; accordingly, all such frames may be routed from decision block 591 to the processing branch at the right of FIG. 5. A DSA frame may be processed (block 593) by the switch, and the frame may be mapped to an egress port (block 506) without the additional egress/ingress operations represented by blocks 503 and 504. As described above with reference to FIG. 4, other types of MGMT frames may also be processed in this manner, e.g., by assigning a DSA tag to a non-DSA MGMT frame; as set forth above, use of an extended DSA Tag may reduce or eliminate the need to employ dedicated ports. Additionally or alternatively, port registers and internal logic, either operating independently or in conjunction with software instruction sets, may readily be implemented to allow internal processing of DSA Tagged MGMT frames.

It will be appreciated that the foregoing solutions properly identify and handle MGMT frames and process those MGMT frames independent of ordinary network traffic. The strategies set forth above support interfacing DSA enabled switches with non-DSA, generic network devices.

Several features and aspects of the present invention have been illustrated and described in detail with reference to particular embodiments by way of example only, and not by way of limitation. Those of skill in the art will appreciate that alternative implementations and various modifications to the disclosed embodiments are within the scope and contemplation of the present disclosure. Therefore, it is intended that the invention be considered as limited only by the scope of the appended claims.

What is claimed is:

1. A method of processing frames received in a network switch, the method comprising:
   identifying control frames from the received frames, wherein a control frame includes instruction messages, and identifying non-control frames that include data traffic;
   for identified control frames, modifying the control frames by inserting a value for an EtherType within the control frame;
   wherein the value of the EtherType is not inserted within the non-control frames; and
   transmitting the frames to a central processing unit (CPU) or other frame processing device within the network switch wherein the CPU is configured to identify the control frames from the non-control frames by the value of the EtherType in the frames.

2. The method of claim 1, further comprising:
   after the frames are processed by the CPU, identifying the control frames from the non-control frames;
   for the control frames, identifying the value of the EtherType in the control frames and modifying the control frames by removing the value of the EtherType from the control frame; and
   transmitting the modified control frames out the network switch using at least control data, and transmitting the non-control frames out the network switch in an unmodified form or in a modified form modified by a switch protocol.

3. The method of claim 2, wherein the control data is inserted into the modified control frames, wherein the control data includes a distributed switching architecture (DSA) tag.

4. The method of claim 1, wherein the value of the EtherType is inserted in one or more fields within a tag in the frame.

5. The method of claim 1, wherein identifying whether a frame is a control frame includes determining if the frame includes at least an address that is directed to the CPU or includes an address from the CPU.

6. The method of claim 1, further comprising:
   identifying frames from the received frames that include a tag; and
   mapping the identified frames to a port that is enabled to process tagged frames.

7. A switch comprising:
   a central processing unit (CPU) configured to process frames;

at least a first port configured to receive frames from a network connection;

wherein the first port is configured to (i) identify control frames from the received frames, wherein a control frame includes instruction messages, and (ii) identify non-control frames that include data traffic;

a second port connected to the first port via a first data path and configured to transmit frames to the central processing unit;

wherein the second port is configured to process frames received from the first port by (i) for identified control frames, modifying the control frames by inserting a value for an EtherType within the control frame; and (ii) not inserting the value of the EtherType within the non-control frames; and wherein the central processing unit is configured to receive the frames from at least the second port and is configured to identify the control frames from the non-control frames by the value of the EtherType in the frames.

8. The switch of claim 7, wherein when receiving frames via the second port, the switch is configured to identify the value of the EtherType in the control frames and modify the control frames by removing the value of the EtherType from the control frame; and wherein the switch is configured (i) to transmit the modified control frames out the switch based on at least control data, and (ii) to transmit the non-control frames out the network switch in an unmodified form.

9. The switch of claim 7, wherein the second port is configured to insert the value of the EtherType and control data in one or more fields within a tag in the frame.

10. The switch of claim 7, wherein the second port includes a programmable register configured to identify the control frames.

11. The switch of claim 7, wherein the switch includes a programmable register configured to identify whether a frame is a control frame by determining if the frame includes at least an address that is directed to the CPU or includes an address from the CPU.

12. The switch of claim 7, further comprising a programmable register configured to:
identify frames that include a tag; and
map the identified frames to a port that is enabled to process tagged frames.

13. A network switch, comprising:
at least one port for receiving and transmitting frames;
means for identifying control frames from the received frames, wherein a control frame includes instruction messages, and identifying non-control frames that include data traffic;
means for modifying, for identified control frames, the control frames by inserting a value for an EtherType within the control frame;
wherein the value of the EtherType is not inserted within the non-control frames; and
means for transmitting the frames to a central processing unit (CPU) wherein the CPU is configured to distinguish the control frames from the non-control frames by the value of the EtherType in the frames.

14. The network switch of claim 13, wherein
after the frames are processed by the CPU, the network switch is configured to:
identify the control frames from the non-control frames based on the value of the EtherType in each frame;
modify the identified control frames by removing the value of the EtherType from the control frames; and
transmit the modified control frames out the network switch based on at least control data, and transmit the non-control frames out the network switch in an unmodified form.

15. The network switch of claim 13, wherein the means for modifying is configured to insert the value of the EtherType and control data in one or more fields within a tag in the frame.

16. The network switch of claim 15, wherein the control data includes a distributed switching architecture (DSA) tag.

17. The network switch of claim 13, wherein the means for identifying is configured to identify whether a frame is a control frame by determining if the frame includes at least an address that is directed to the CPU or includes an address from the CPU.

18. The network switch of claim 13, wherein the means for identifying is further configured to:
identify frames that include a tag; and
map the identified frames to a port that is enabled to process tagged frames.

19. The network switch of claim 13, wherein the means for identifying, the means for modifying, and the means for transmitting includes at least port registers, internal logic, either operating independently or in conjunction with software instruction sets, firmware, or switching hardware, or combinations thereof.

* * * * *